(12) United States Patent
Murthy et al.

(10) Patent No.: US 10,847,356 B2
(45) Date of Patent: Nov. 24, 2020

(54) ANALYZER APPARATUS AND CONTROL METHOD

(71) Applicant: ATONARP INC., Tokyo (JP)

(72) Inventors: Prakash Sreedhar Murthy, Tokyo (JP); Anoop R. Hegde, Tokyo (JP); Takeshi Sato, Tokyo (JP)

(73) Assignee: ATONARP INC., Tokyo (JP)

( * ) Notice: Subject to any disclaimer, the term of this patent is extended or adjusted under 35 U.S.C. 154(b) by 379 days.

(21) Appl. No.: 15/776,213

(22) PCT Filed: Nov. 17, 2016

(86) PCT No.: PCT/JP2016/084120
§ 371 (c)(1),
(2) Date: May 15, 2018

(87) PCT Pub. No.: WO2017/086393
PCT Pub. Date: May 26, 2017

(65) Prior Publication Data
US 2020/0251320 A1    Aug. 6, 2020

(30) Foreign Application Priority Data

Nov. 17, 2015 (JP) .................................. 2015-225201

(51) Int. Cl.
*H01J 49/26* (2006.01)
*G01N 27/62* (2006.01)
(Continued)

(52) U.S. Cl.
CPC .......... *H01J 49/022* (2013.01); *G01N 27/622* (2013.01); *H01J 49/24* (2013.01)

(58) Field of Classification Search
CPC ....... H01J 49/022; H01J 49/24; G01N 27/622
(Continued)

(56) References Cited

U.S. PATENT DOCUMENTS 6,168,707 B1 * 1/2001 Somes ............... G01N 27/4165
204/400
8,704,193 B1    4/2014 Kholomeev
(Continued)

FOREIGN PATENT DOCUMENTS

JP      56-102046 A    8/1981
JP    2000-067808 A    3/2000
(Continued)

OTHER PUBLICATIONS

Supplemental Partial European Search Report issued in corresponding European Patnet Application No. 16 86 6394, dated May 20, 2019 (18 pages).
(Continued)

*Primary Examiner* — Nicole M Ippolito
(74) *Attorney, Agent, or Firm* — Buchanan Ingersoll & Rooney PC (57) ABSTRACT

An analyzer apparatus includes: an ionization unit that ionizes molecules to analyze; a filter unit that forms a field for selectively passing ions generated by the ionization unit; a detector unit that detects ions that have passed through the filter unit; an ion drive circuitry that electrically drives the ionization unit; a field drive circuitry that electrically drives the filter unit; a control unit that controls outputs of the ion drive circuitry and the field drive circuitry; a temperature detecting unit that detects the temperature of the ion drive circuitry and the field drive circuitry; and a correction unit that corrects output settings of the ion drive circuitry and the field drive circuitry based on the temperature detected by the temperature detecting unit.

14 Claims, 5 Drawing Sheets

(51) Int. Cl.
*H01J 49/06* (2006.01)
*H01J 49/02* (2006.01)
*H01J 49/24* (2006.01)

(58) Field of Classification Search
USPC .................................. 250/281, 282, 283, 288
See application file for complete search history.

(56) References Cited

U.S. PATENT DOCUMENTS

| | | | |
|---|---|---|---|
| 2011/0108726 A1 | 5/2011 | Hiraoka et al. | |
| 2013/0277547 A1* | 10/2013 | Sato | H01J 49/04 250/282 |
| 2014/0083536 A1* | 3/2014 | Yoshizaki | B23H 1/10 137/565.17 |
| 2015/0235829 A1 | 8/2015 | Chung et al. | |
| 2016/0172170 A1 | 6/2016 | Murthy | |
| 2017/0186595 A1* | 6/2017 | Monroe | H01J 49/0027 |

FOREIGN PATENT DOCUMENTS

| | | |
|---|---|---|
| JP | 2009-187850 A | 8/2009 |
| JP | 2011-023167 A | 2/2011 |
| JP | 2014-022162 A | 2/2014 |
| JP | 2014-123577 A | 7/2014 |
| WO | 2009/157312 A1 | 12/2009 |
| WO | 2014/118122 A2 | 8/2014 |
| WO | 2015/029449 A1 | 3/2015 |

OTHER PUBLICATIONS

English Translation of International Search Report (Form PCT/IB/338 and PCT/IPEA/409) dated Jun. 7, 2018, by the International Bureau of WIPO in corresponding International Application No. PCT/JP2016/084120. (6 pages).

International Search Report (PCT/ISA/210) dated Jan. 31, 2017, by the Japan Patent Office as the International Searching Authority for International Application No. PCT/JP2016/084120. (5 pages).

Written Opinion (PCT/ISA/237) dated Jan. 31, 2017, by the Japan Patent Office as the International Searching Authority for International Application No. PCT/JP2016/084120. (4 pages).

International Preliminary Report on Patentability (Form PCT/IPEA/409) dated Nov. 21, 2017, by the European Patent Office for International Application No. PCT/JP2016/084120. (3 pages).

English translation of Notice of Reasons for Refusal issued in corresponding Japanese Patent Application No. 2018-032017, dated Feb. 26, 2020 (5 pages).

English translation of Notice of Reasons for Refusal issued in corresponding Japanese Patent Application No. 2018-149245, dated Feb. 26, 2020 (4 pages).

\* cited by examiner

ANALYZER APPARATUS AND CONTROL METHOD

TECHNICAL FIELD

The present invention relates to an analyzer apparatus, such as a mass spectrometer.

BACKGROUND ART

International Publication WO2015/029449 discloses an analyzer apparatus that has an ionization unit that ionizes molecules to analyze, a filter unit that selectively passes ions that have been generated by the ionization unit, and a detector unit that detects ions that have passed through the filter unit, where the detector unit includes a plurality of detection elements arranged in a matrix, and the analyzer apparatus further includes a reconfiguration unit that switches between detection patterns that set which detection elements out of the plurality of detection elements are valid for detection. The ionization unit includes a plurality of ion sources, and the analyzer apparatus further includes a driving control unit that switches the connections of the plurality of ion sources based on changes in the characteristics of the ion sources.

SUMMARY OF INVENTION

There is ongoing demand for analyzer apparatuses such as mass spectrometers to be made smaller and more precise.

One aspect of the present invention is an analyzer apparatus including: an ionization unit that ionizes molecules to analyze; a filter unit that forms a field for selectively passing ions generated by the ionization unit; a detector unit that detects ions that have passed through the filter unit; an ion drive circuitry that electrically drives the ionization unit; a field drive circuitry that electrically drives the filter unit; a detector circuitry that controls the sensitivity of the detector unit; a control unit that controls outputs of the ion drive circuitry and the field drive circuitry; a temperature detecting unit that detects a temperature about at least one circuitry out of the ion drive circuitry and the field drive circuitry; and a correction unit that corrects an output setting of the at least one circuitry out of the ion drive circuitry and the field drive circuitry based on the temperature detected by the temperature detecting unit. The correction unit may be implemented as a function of the control unit or may be implemented as an independent unit.

The correction unit may correct (or compensate or adjust) all of the respective output settings of the ion drive circuitry and the field drive circuitry based on the detected temperature. Typical examples of fields that selectively pass ions are an electric field, a magnetic field, and an electromagnetic field, and the field that selectively passes ions may include at least one of such fields.

The respective outputs of the ion drive circuitry and the field drive circuitry minutely vary according to the temperature of the boards on which such circuitry are mounted or the ambient temperature about the boards, and the present inventors have found that by compensating for such variations, it is possible to improve the linearity of units that are driven by these circuitry and thereby improve the detection precision. By adding a function that compensates or corrects the outputs of these circuitry according to temperature, it becomes possible to house all or part of an analyzer apparatus that includes an ion drive circuitry, a field drive circuitry, and a control unit in a compact, handy-type housing unit.

The analyzer apparatus may include a detector circuitry that controls the output sensitivity (or "gain") of the detector unit, the temperature detecting unit may include a function that detects the temperature about the detector circuitry, and the correction unit may include a unit (or function) that corrects a sensitivity setting of the detector circuitry based on the temperature detected by the temperature detecting unit.

Another aspect of the present invention is an analyzer apparatus including a sensor housing that houses an ionization unit, a filter unit, and a detector unit in order; a chamber in which the sensor housing is housed; a depressurization unit that depressurizes an inside of the chamber; and a capillary that introduces gas including molecules to analyze into the ionization unit or a periphery of the ionization unit of the sensor housing. By connecting a capillary to the sensor housing in which the units for measuring, such as the ionization unit, are housed, not to the chamber, it is possible to measure the gas to be measured in real time in a manner that is not susceptible to being affected by the condition in the chamber.

In addition, by providing a unit that feedback-controls a temperature and an internal pressure of the chamber outside the sensor housing using the depressurization unit, it is possible to stably control the state inside the chamber. Conventionally, the conditions inside a sensor housing are kept constant by making the volume of the chamber sufficiently larger than the sensor housing. On the other hand when feedback control is performed on the pressure inside the chamber, it is preferable for the state inside the sensor housing to appear in the chamber, and for the volume $Vc$ of the chamber to be as close as possible to the volume $Vh$ of the sensor housing. As one example, it is preferable for the ratio $Vc/Vh$ to be in a range of 1.5 to 10, with a range of 1.5 to 5 even more preferable. With this method, it is possible to make the chamber smaller and to greatly reduce the size of the entire system.

Yet another embodiment of the present invention is an analyzer apparatus that further includes a unit that stabilizes an emission current of the ionization unit via the ion drive circuitry. The control unit may include a function as the unit that stabilizes or the unit that stabilizes may be an independent unit. It is possible to provide an analyzer apparatus capable of precisely performing quantitative measurement by stabilizing the amount of ions inputted into the filter unit, that is, by making the amount of ions effectively constant.

Yet another aspect of the present invention is a control method of an analyzer apparatus, the analyzer apparatus including: an ionization unit that ionizes molecules to analyze; a filter unit that forms a field for selectively passing ions generated by the ionization unit; a detector unit that detects ions that have passed through the filter unit; an ion drive circuitry that electrically drives the ionization unit; a field drive circuitry that electrically drives the filter unit; a control unit that controls outputs of the ion drive circuitry and the field drive circuitry; and a temperature detecting unit that detects a temperature about at least one circuitry out of the ion drive circuitry and the field drive circuitry, wherein the control method includes correcting, by the control unit, an output setting of the at least one circuitry based on the temperature detected by the temperature detecting unit.

DESCRIPTION OF EMBODIMENTS

Figure 1:
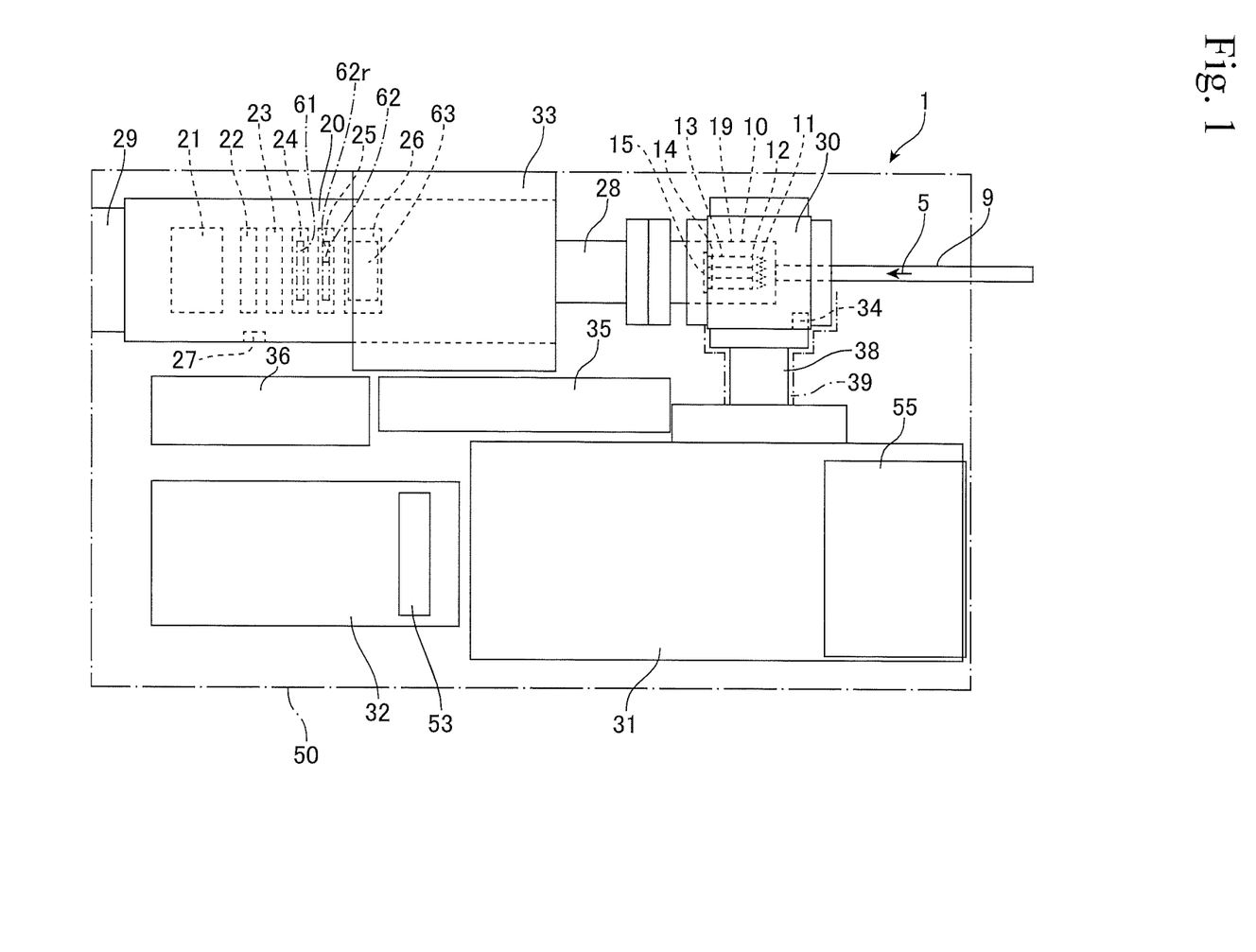
FIG. 1 depicts the overall configuration of a gas analyzer apparatus equipped with a quadrupole mass spectrometer sensor.

FIG. 1 depicts one example of a gas analyzer apparatus (or "gas analysis system"). This analyzer apparatus (analyzer device, analyzer) 1 is a mass spectrometer apparatus that incorporates a quadrupole mass sensor, and is designed to quantitatively analyze the components (molecules) of a gas 5 that is introduced by a capillary 9. The analyzer system 1 includes a quadrupole mass sensor (hereinafter simply "sensor") 10, a control box 20 that drives the sensor 10 and analyzes data obtained from the sensor 10, a chamber 30 that houses the sensor 10, a turbo pump (turbo molecular pump) 31 and a diaphragm pump (roughing vacuum pump) 32 that are connected to the chamber 30 by a connecting pipe 38 and form a unit (depressurizing unit) for depressurizing the interior of the chamber 30, a pressure gauge 33 that monitors the internal pressure of the chamber 30, a terminal block 35 for connecting internal and external wiring of the apparatus, and a power supply unit 36, with these components being housed in a rectangular housing (housing unit) 50. The size of the housing unit 50 is about 300 mm×150 mm×150 mm, which means that a mass spectrometer, whose size is conventionally measured in meters, is miniaturized into a so-called "handy size" that is compact and portable.

The sensor 10 includes an ionization unit 11 that ionizes molecules of the gas 5, an ion lens 12, a quadrupole filter 13, a Faraday cup 14 that is an ion detector, and a sensor housing 19 that is cylindrical (tube-like) and in which the components 11, 12 13 and 14 are housed in the stated order. The ionization unit 11 includes a filament that is an ion source, so that thermal electrons emitted from the filament and molecules to analyze or scan collide to ionize the molecules. The quadrupole filter 13 is a filter unit which forms a field for selectively passing ions, and in the present embodiment, forms a quadrupole field as a field that selectively passes ions. That is, the quadrupole filter 13 has four electrodes as one set and forms a quadrupole field that has a DC component and a high frequency component in a space surrounded by the electrodes. When ions pass along the central axis of the quadrupole field, the ions are repeatedly subjected to a focusing force and a diverging force in directions that are perpendicular to the velocity. This means that at the quadrupole filter 13, when the frequency of the high frequency component, the DC and high-frequency voltages of the quadrupole field formed in the filter 13, and the mass-to-charge ratio satisfy predetermined conditions, ions of the same mass-to-charge ratio will selectively pass through the quadrupole field and reach the ion detector 14, where the amount of arriving ions is measured as an ion current.

The sensor 10 is attached to the cubic like chamber 30 so that the sensor housing 19 passes through one side wall surface of the chamber 30, with substantially the entire sensor housing 19 housed inside the chamber 30. The front end of the sensor housing 19 (i.e., the ionization unit 11-side) and the capillary 9 are connected, so that the gas 5 introduced via the capillary 9 flows out into the chamber 30 via the sensor housing 19. The sensor housing 19 is connected to (fluidly communicated with) the chamber 30 for example by having a gap for attaching the filament of the ionization unit 11, an opening 15 provided in the vicinity of the ion detector 14 or the filter unit 13, or the like, so that the interior of the housing 19 is kept at fundamentally the same depressurized condition (state) as the chamber 30.

The gas 5 that has been introduced via the capillary 9 is first introduced into the sensor housing 19 and released into the chamber 30, before being discharged out of the system by the turbo pump 31 or the like. This means that it is possible to precisely analyze components of the gas 5 supplied via the capillary 9 in real time without gas that has circulated in the chamber 30 entering the sensor housing 19.

The rear of the sensor housing 19 is attached to the control box 20 via an attachment pipe 28 that houses wiring. The control box 20 houses a Pirani board 23 that controls the pressure gauge (pressure monitor) 33, an ion drive board 24 on which an ion drive circuitry (ion drive circuit) 61 that electrically drives the ionization unit 11 is mounted, a field drive board 25 on which a field drive circuitry (field drive circuit) 62, which includes an RF drive unit (RF unit) 62r that electrically drives the quadrupole filter 13, is mounted, a detector board 26 on which a detector circuitry (detector circuit) 63, which controls the output sensitivity (gain) of the ion detector 14 is mounted, a CPU 21 that performs overall control, a micro-controller board 22 that is connected to the CPU 21 and the respective boards described above and controls other devices such as the turbo pump 31, the fan 29 that cools the inside of the control box 20, and a temperature sensor 27 that detects the temperature of each board.

One example of the temperature sensor 27 is an infrared thermopile sensor, which detects the temperature inside the control box 20 as a representative value (a temperature about each circuitry, a temperature around each circuitry), but it is also possible to detect infrared rays from each board and detect the temperature of each board as the temperature about or around (in a periphery of) the respective circuitry. It is also possible to attach a temperature sensor, such as an infrared sensor, a thermocouple, or a resistance temperature detector to each board, for example, the ion drive board 24, the field drive board 25, and the detector board 26 to acquire the temperature about or around the circuitry mounted on the respective boards.

The analysis system 1 further includes: a vacuum and temperature control interface unit 55 which controls the internal pressure of the chamber 30 and controls the temperature of a heater 39 that heats a vacuum system including the chamber 30 and a pipe 38 that connects the chamber 30 and the turbo pump (turbo molecular pump) 31; and a fan 53 that ventilates the inside of the housing 50 to control the temperature. The vacuum and temperature control interface unit 55 includes a function for monitoring the temperature of the chamber 30 using a temperature sensor provided to measure the temperature inside the chamber 30, typically an infrared thermopile sensor 34.

Figure 2:
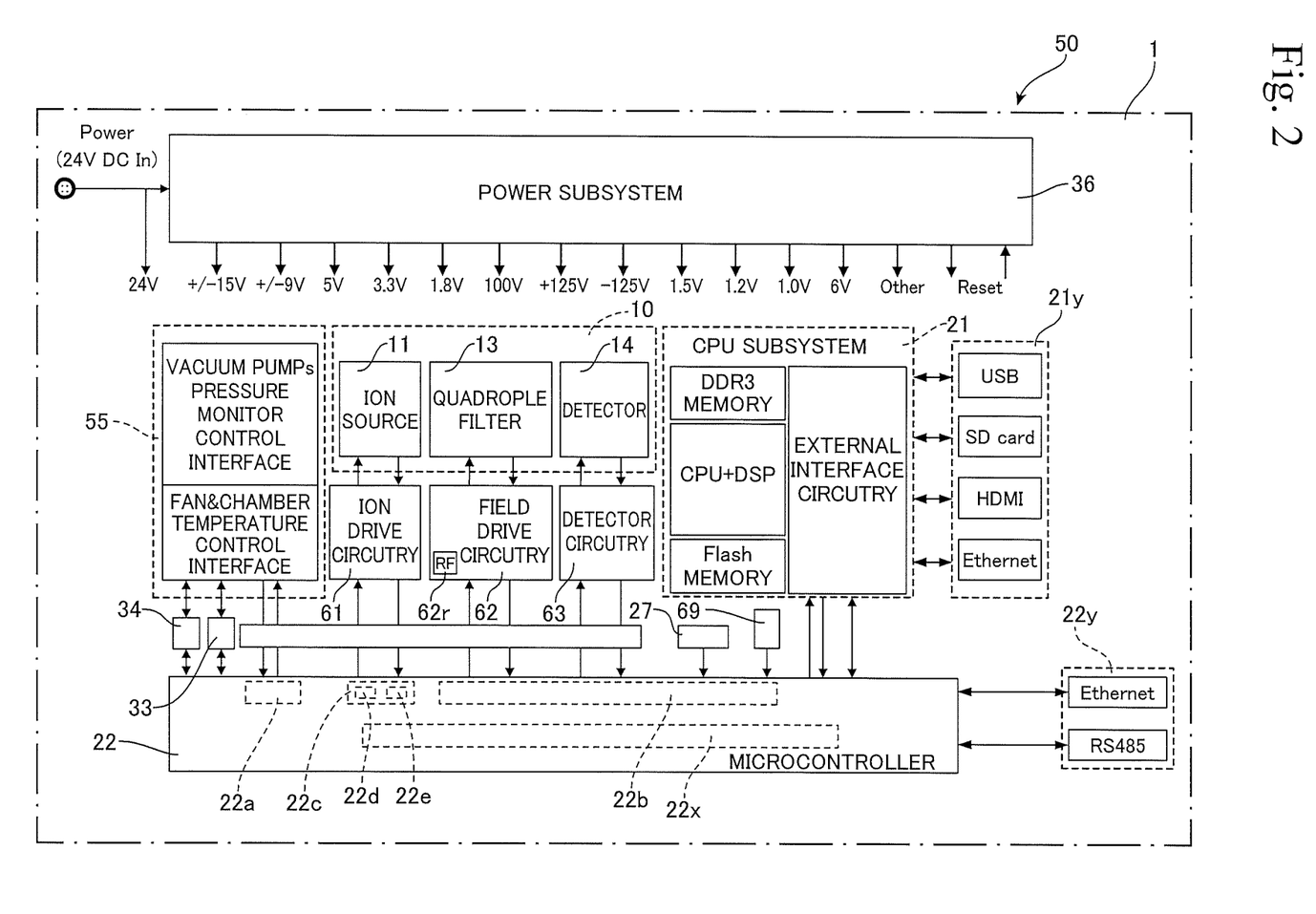
FIG. 2 is a block diagram of an analyzer apparatus.

FIG. 2 depicts the electrical system configuration of the analyzer apparatus 1. The microcontroller (control unit) 22 includes a unit (functional unit) 22x that operates in cooperation with a CPU subsystem 21 to control the outputs of the circuitry 61, 62, and 63 according to analytes (the objects to be measured), environmental conditions, and the like of the sensor 10 and thereby manage the operation of the analyzer apparatus 1. The operation management unit 22x also includes a function (unit) that changes the condition of the filter unit 13 to vary the mass-to-charge ratio that passes through the filter unit 13 sequentially to operate the analytical device 1 in scan mode. Corresponding to the CPU subsystem 21 and the microcontroller 22, the analyzer apparatus 1 includes communication interfaces 21y and 22y that are compliant with various standards, such as USB, SD cards, HDMI (registered trademark), Ethernet (registered trademark), and RS 485.

The microcontroller 22 includes a pressure and temperature control unit (pressure and temperature control function) 22a that feedback-controls the degree of vacuum and temperature of the chamber 30 based on information obtained from the pressure monitor 33 and the vacuum and temperature control interface unit 55. Although the pressure and temperature control unit 22a controls the performance of the pumps 31 and 32 to control the degree of vacuum, the pressure and temperature control unit 22a mainly controls the rotating speed of the turbo molecular pump 31 on the high vacuum side to maintain a predetermined degree of vacuum. The pressure and temperature control unit 22a simultaneously controls the power of the heater 39 so as to keep the temperature of the chamber 30 constant.

When the degree of vacuum in the chamber 30 is controlled to keep the performance of the sensor 10 constant, the larger the volume of the chamber 30, the smaller the fluctuations in the degree of vacuum, so that conventional chambers 30 have commonly had a volume that is for example twenty times the sensor 10 or larger. However, since the output of the sensor 10 (the detector 14) will not change unless the gas inside the chamber 30 is replaced, when the volume of the chamber 30 is large, the sensitivity to variation in time is low, and since a mere average value of the gas in the chamber 30 is detected by the sensor 10, there has been the drawback of reduced sensitivity to variations in the components. There has been a further problem in that once the degree of vacuum in the chamber 30 has varied due to factors such as temperature, it takes a long time to return to the desired state.

In contrast, in the present system 1, by reducing the volume of the chamber 30, it becomes possible to stabilize the measurement conditions and solve the above problems. That is, first, by reducing the volume of the chamber 30, variations in the internal conditions of the chamber 30 are more sensitively captured by the pressure monitor 33 and/or the temperature sensor 34. By improving the precision of the feedback control performed based on the degree of vacuum and temperature in the chamber 30 with controlling the vacuum pumps 31 and 32 that form the depressurization unit, it is possible to stabilize the conditions inside the chamber 30. In addition, by reducing the volume of the chamber 30, it is possible to measure real-time variations in the gas components more precisely. Also, by reducing the volume of the chamber 30, there is a further merit in that it is possible to make the analysis system 1 compact enough to be portable. The capacity Vc of the chamber 30 and the volume Vh of the sensor housing 19 should preferably satisfy the following condition.

$$1.5 < Vc/Vh < 10 \quad (1)$$

The upper limit of Condition (1) is preferably 8, more preferably 5, and even more preferably 3.

The pressure monitor 33 that monitors the internal pressure of the chamber 30 is configured to monitor the pressure in the region outside the sensor housing 19 within the chamber 30. If there is variation in the pressure of the gas 5 supplied from the capillary 9, the effect of this will appear after the gas 5 has flowed out into the chamber 30 via the sensor housing 19, and even though the chamber 30 has a low volume, this volume is still large compared to the capillary 9, which suppresses sudden variations in pressure. Accordingly, since the pressure variations that are to be monitored are reduced, the operating of the depressurization unit configured by the vacuum pumps 31 and 32, especially the operation of the turbo pump 31 that controls targeting the internal pressure of the chamber 30 can be moderated, which makes it possible to more smoothly cope with variations in pressure of the gas 5 supplied from the capillary 9.

The microcontroller 22 further includes a correction unit (correction function, compensation function or unit, or adjustment unit) 22b that makes various corrections (compensation, or adjustment) to the output settings of the ion drive circuitry 61 and the field drive circuitry 62 and the sensitivity settings (gain setting) of the detector circuitry 63 based on the temperature about or around (in the periphery of) the circuitry detected by the temperature detection unit (temperature sensor) 27. In this example, the correction unit 22b corrects the respective output settings of the ion drive circuitry 61 and the field drive circuitry 62, and the gain setting of the detector circuitry 63 in a unit of 10° C. (in 10° C. increments) in a range from 0° C. to 80° C. by referring to a look-up table 69 in which correction amounts for the setting values are stored in advance. In place of the look-up table 69, it is also possible to use a method, such as functions or equations, that calculates or outputs correction values.

For example, in the RF drive unit 62r of the field drive circuitry 62, to forms the quadrupole field in the quadrupole filter 13, it is necessary to output an RF voltage, a DC+ voltage, and a DC− voltage linearly proportional to AMU units. However, the output (voltage and/or current) of the RF drive unit 62r slightly fluctuates according to the environmental temperature where the field drive circuitry 62, which includes the RF drive unit 62r, is installed, so that there may be a drop in linearity with respect to AMU. This error can cause measurement errors.

When the components included in the gas 5 are qualitatively determined, variations in the output of the RF drive unit 62r will have little effect on qualitative measurements. On the other hand, when the components included in the gas 5 are quantitatively determined, unless the linearity of the RF voltage and the like with respect to AMUs is guaranteed, there is the risk that converting the measurement results of the ion currents to concentrations will no longer be meaningful. Accordingly, the correction unit 22b refers to compensation values output setting values, correction values, or differences) stored in the look-up table 69 that have been determined in advance using the environmental temperature of (temperature about) the RF drive unit 62r, and varies the output setting (base value or base curve) of the RF drive unit 62r, in this example, changes the output setting values with respect to AMUs depending on the temperature within a predetermined range, so that even if the environmental temperature varies, the linearity with respect to AMUs, of the RF voltage, the DC+ voltage, and the DC− voltage outputted from the RF drive unit 62r is maintained.

Accordingly, although this analyzer 1 is a quadrupole mass spectrometer, it is possible to perform quantitative analysis that was not conventionally possible. The present invention is not limited to a quadrupole field, and when controlling, based on the characteristics of ions or molecules such as AMUs, mass-to-charge ratios, and ion mobilities, the voltage or current that form (drive) a "field" that is an electric field, a magnetic field, or an electromagnetic field that selectively passes and/or holds ions, it is possible, by controlling or correcting a signal or information that controls the voltage or current used for driving the field, relative to a temperature itself or temperature difference based on the temperature about the circuitry outputting the signal, to suppress the temperature dependency of the voltage or current that drives the field, which makes it possible to form a higher precision field in the filter unit 13.

For the ion drive circuitry 61, although a sensitivity to the environmental temperature (temperature about the circuitry) and tendencies may differ to the field drive circuitry 62, the output of the ion drive circuitry 61 may vary. At the ion drive circuitry 61, for example, the filament voltage and/or the filament current of the ionization unit 11 may fluctuate depending on the temperature, and therefore it may be effective to correct or compensate the settings of these voltage and current values, for example, a base curve or base value, according to temperature by the correction unit 22b. For the detector circuitry 63, the gain of the Faraday cup and/or electron multiplier that is the detector 14 and the amplification (gain) of the output signal can be corrected or compensated according to temperature. Using the same method as for the field drive circuitry 62, the compensation unit 22b corrects the setting values for these circuitry 61 and 63 to ensure linearity.

The microcontroller (control unit) 22 further includes a stabilizing unit 22c that stabilizes, via the ion drive circuitry 61, an emission current Ea that indicates the ionizing power of the ionization unit 11. In this example, the emission current Ea is controlled to 0.1%, that is, to an nA level. By controlling the variations in the emission current Ea of the ionization unit 11 to 1% or below, and more preferably to 0.1% or below, the amount of ions inputted into the filter unit 13 can be kept effectively constant. This means that the amounts of the various ions separated by the filter unit 13 and detected at the detector unit 14, that is, the content (content ratios, proportions) of the gas 5, can be quantitatively determined with high precision.

The ionization unit 11 in the present embodiment is configured to output thermal electrons using a filament. The stabilizing unit 22c includes a first stabilizing unit (convergence unit) 22d, which measures an ion box current, for example, as the emission current Ea and controls the filament voltage Fv to ramp up or down according to a look-up table or the like that has been set in advance so that the emission current Ea is within ±1% of a target current Et, and a second stabilizing unit (feedback control unit) 22e, which shifts the filament voltage Fv by a minute amount (Δf) by feedback control so that the emission current Ea is within ±0.1% of the target current Et. One example of feedback control is PID (proportional-integral-derivative control).

Figure 3:
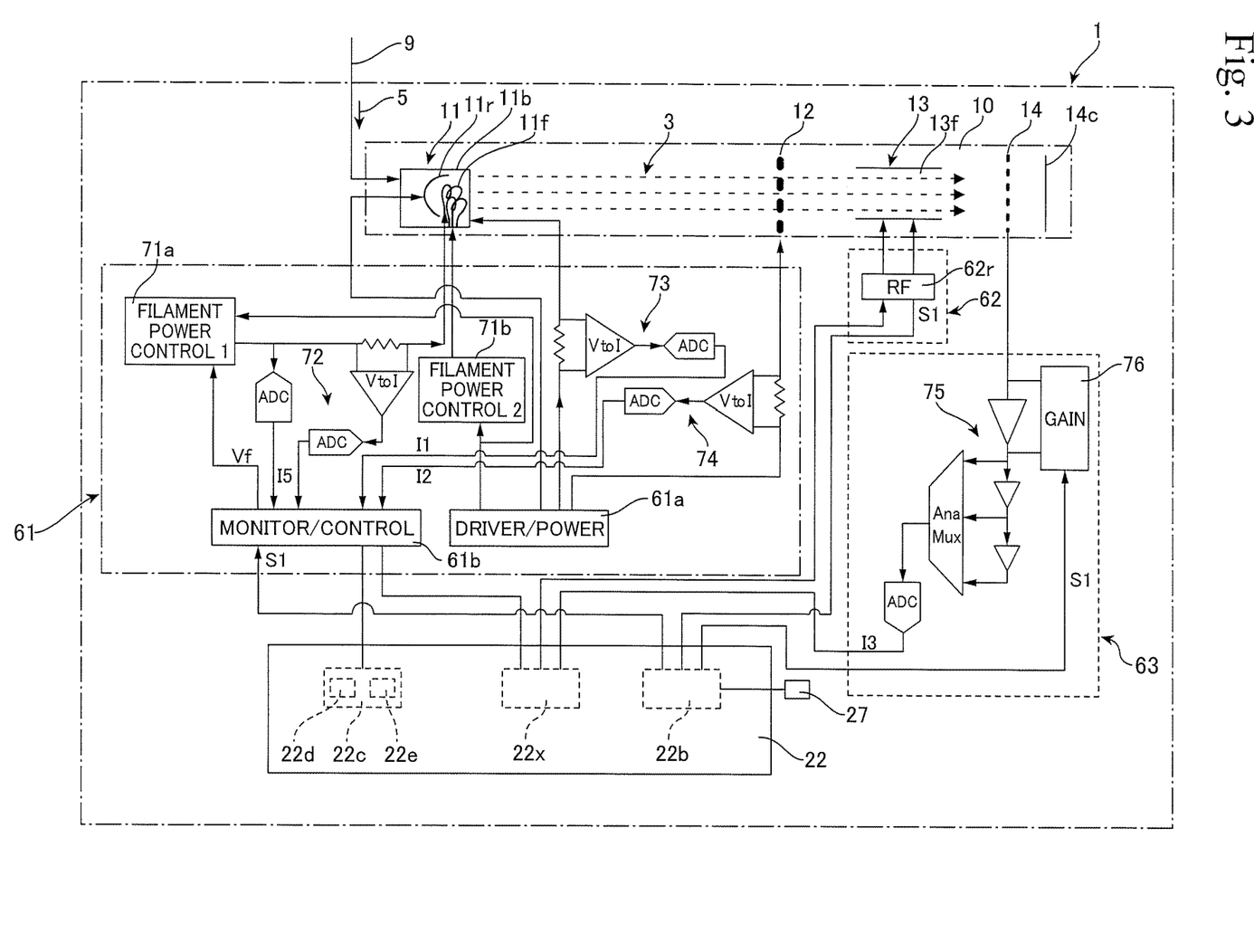
FIG. 3 is a board-level block diagram of the analyzer apparatus.

FIG. 3 depicts the more detailed configuration of the ion drive circuitry 61 and the detector circuitry 63 by way of a block diagram. The ionization unit 11 includes filaments 11f and a repeller electrode 11r disposed in an ion box 11b. The gas 5 inputted into the sensor 10 by the capillary 9 is ionized by the ionization unit 11, and the generated ion flow (ionized gas) 3 is guided to the field (quadrupole field) 13f of the filter unit 13 by the ion lens 12. Ions that have been separated and/or selected by the field 13f reach the detector unit 14 and are observed as an ion current flowing across the collector 14c.

The ion drive circuitry 61 includes a driver unit 61a that supplies power to elements that construct the ionization unit 11 and a monitor/control unit (monitor and control unit) 61b that monitors and controls the ionization unit 11. As one example, the driver unit 61a supplies filament driving power via a filament power control units 71a and 71b to the two filaments 11f respectively, sets the repeller voltage of the repeller electrode 11r, and sets the voltages of the ion box 11b and the ion lens 12. The filament power control units 71a and 71b include MOSFET switches that respectively shut down the power of the corresponding filament immediately.

The ion drive circuitry 61 includes a circuitry 72 that measures a filament voltage Vf and a filament current If, and in the present embodiment provides feedback via the monitor/control unit 61b to the microcontroller 22. The ion driver circuitry 61 further includes circuitry 73 and 74 that respectively measure the ion box current I1 and the ion lens current I2, and in the present embodiment, provide feedback via the monitor/control unit 61b to the microcontroller 22.

The filament power control units 71a and 71b control the voltage Vf supplied to the respective filaments 11f as outputs and monitor the filament current If. As one example, the filament voltage Vf is controlled so as to increase or decrease in steps (ramp up or down) when the analyzer apparatus 1 starts and stops, and in a steady state, is controlled to become a voltage capable of emitting thermal electrons that can ionize the molecules to analyze (to be measured) and is controlled so that the emission current Ea becomes constant. As the emission current Ea, it is possible to refer to the ion box current I1 and/or the ion lens current I2. The ion box current I1 has a large current value due to being close to the filament 11f, which makes it easy to grasp changes in the emission current Ea. On the other hand, the ion box current I1 could conceivably be affected by the electrons emitted from the filament 11f. For this reason, in the present embodiment, by comparing the ion box current I1 and the ion lens current I2, an emission current Ea that excludes the effects of thermal electrons from the ion box current I1 is determined.

The filament voltage Vf is controlled so that the emission current Ea becomes constant, for example, to produce a tolerance with respect to the target current Et of 0.1% or below, or less than 0.1% (in other words, the tolerance becomes the nA level). This emission current control may be realized by the stabilizing unit 22c of the microcontroller 22 as described above, or may be realized by the monitor/control unit 61b of the ion driver circuitry 61.

Since the characteristics of the circuitry elements that construct the ion drive circuitry 61 may exhibit minute fluctuations according to the temperature around the circuitry, the filament voltage Vf that is the output of the ion drive circuitry 61 may minutely rise and fall according to the temperature. For this reason, the monitor/control unit 61b receives a correction signal S1, which is based on the temperature of the ion drive circuitry 61 itself or the temperature in the periphery of the ion drive circuitry 61, from the correction unit 22b and corrects the voltage that is a standard or base for the filament voltage Vf.

In the same way, in the field drive circuitry 62, the RF unit (RF power amplifier) 62r receives the correction signal S1 and corrects the output settings, such as the voltage and frequency, with the RF output as a standard or base to suppress variations due to the temperature about the circuitry board that includes the field drive circuitry 62. The detector circuitry 63 includes an amplifier 75 that amplifies an ion current I3 obtained by the detector 14, and a gain controller 76 that controls the gain of the amplifier 75, with the gain controller 76 receiving the correction signal S1 and correcting the setting of the gain of the amplifier 75 based on the temperature about the circuitry board that includes the detector circuitry 63 to suppress the influence on the output of the amplifier 75 of the temperature about the circuitry board. As the amplifier 75, as one example it is possible to use a combination of a TIA (transimpedance amplifier) and a VGA (variable gain amplifier) to adjust gain and have high linearity.

Figure 4:
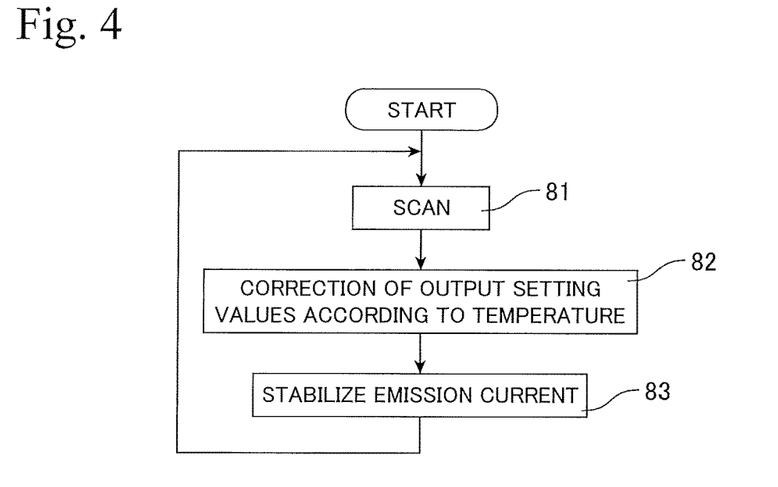
FIG. 4 is a flowchart depicting an overview of processing by the analyzer apparatus.

FIG. 4 depicts an overview of control (processing) executed by the microcontroller (control unit) 22 of the analyzer apparatus 1 by way of a flowchart. When the components of the gas 5 are to be monitored by the analyzer 1, in step 81, the operation management unit 22x causes the analyzer apparatus 1 to operate in scan mode to sequentially detect molecules (components) with different mass-to-charge ratios. In this process, the quadrupole field 13f of the filter unit 13 is controlled by the field drive circuitry 62 so that ions of different mass-to-charge ratios pass through the filter unit 13 in order and reach the detector unit 14.

In step 81, scanning is repeatedly executed to monitor_temporal changes in the components of the gas 5 and/or to get average values of the components acquired at appropriate time intervals. In the scanning, during a scan, each time scanning is repeated or after scanning has been repeated an appropriate number of times, in step 82, the correction unit 22b performs a process that corrects the setting values based on the temperatures about the respective circuitry 61 to 63, and in step 83, the stabilizing unit 22c performs a process that keeps the emission current Ea constant.

Figure 5:
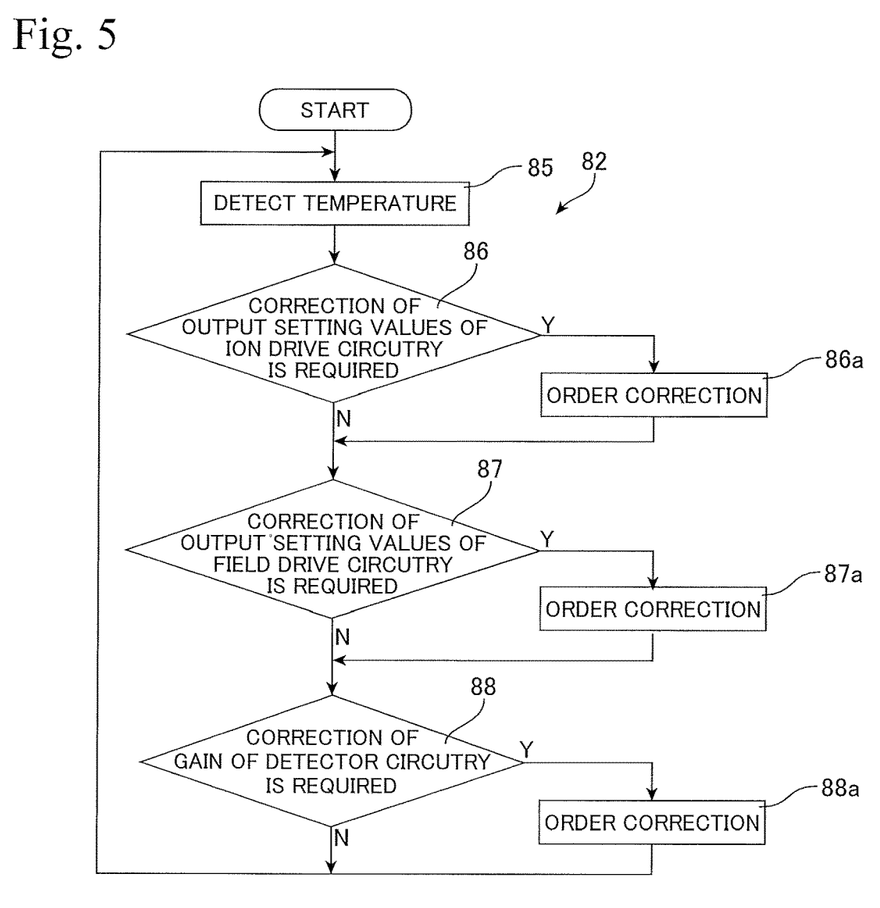
FIG. 5 is a flowchart depicting processing that performs correction according to temperature.

FIG. 5 depicts the process 82 that corrects the output settings (setting values, basic parameters, base curves or the like) of the circuitry according to the temperature about the circuitry (circuits or boards) in more detail. In step 85, the temperatures of the boards on which the respective circuitrys 61 to 63 are mounted or the temperatures in the peripheries thereof are detected. In step 86, the correction unit 22b refers to the look-up table 69 and if it is necessary to change the output setting values of the ion drive circuitry 61, for example, the basic setting values for calculating the filament voltage Vf, with respect to the detected temperature, in step 86a outputs an order of correction (compensation signal) S1 to the ion drive circuitry 61.

In the same way, in step 87, if correction or change of the setting values of the field drive circuitry 62 (in the present embodiment, the RF unit 62r) is required according to the detected temperature about the circuitry, in step 87a, an order of correction is outputted to the field drive circuitry 62. Also, in step 88, if it is necessary to correct or change the sensitivity (or gain) of the detector circuitry 63 according to the detected temperature about the circuitry, in step 88a, an order of correction is outputted to the detector circuitry 63.

In this way, by correcting the output settings and/or sensitivity settings of the respective circuitry 61 to 63 according to the temperatures about the circuitry, it is possible, even when the temperatures about the circuitry 61 to 63 vary, to keep the ionization performance of the ionization unit 11 constant, to keep the ion selecting performance of the filter unit 13 constant, and to keep the sensitivity of the detector unit 14 constant. Accordingly, it is possible to maintain the analytical performance, even when the boards 24 to 26 on which the circuitry 61 to 63 are mounted, the other boards 21 to 23, and the like are housed together with the vacuum pumps 31 and 32, the heater 39, and the like inside the compact housing 50 in which the temperature conditions are susceptible to varying. This means that it is possible to provide a high-performance analyzer 1 with a compact size, such as a "handy-size" device. The correction unit 22b may correct only the output or sensitivity of one or two circuitry, out of the circuitry 61 to 63, whose output or sensitivity is greatly affected by the temperature.

Figure 6:
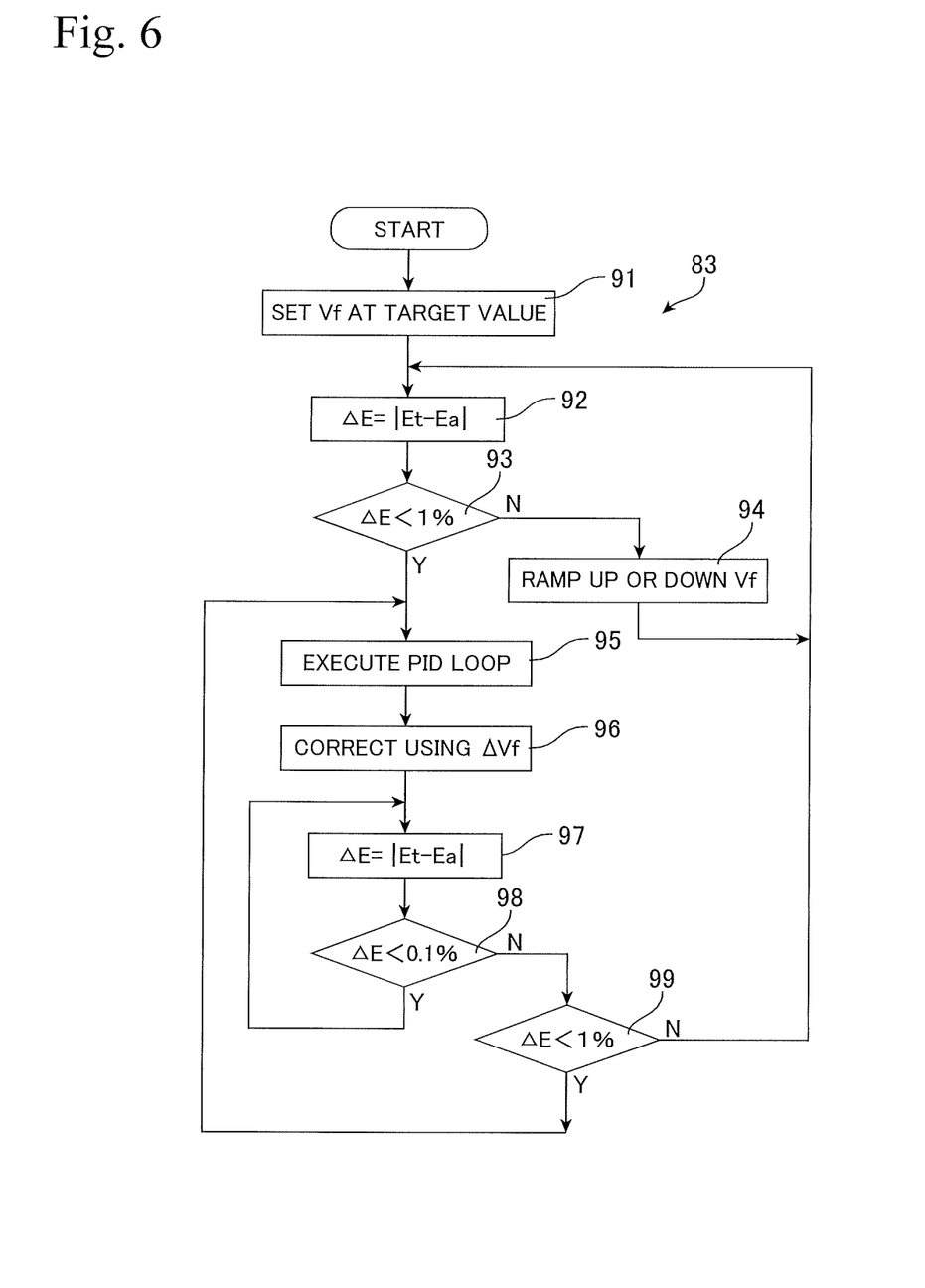
FIG. 6 is a flowchart depicting processing that stabilizes an emission current.

FIG. 6 depicts a process 83 that stabilizes the emission current Ea of the ionization unit 11 in more detail. In step 91, the operation management unit 22x sets the filament voltage Vf at a target value and the ion drive circuitry 61 drives the ionization unit 11 at the set filament voltage Vf. If the analyzer apparatus 1 is being activated or is preparing for stopping, the target value is set according to a sequence that ramps up or down the filament voltage Vf that raises or lowers the filament voltage Vf in steps. During steady operation, in accordance with a lifetime management schedule of the filament 11f, a scheduled voltage that causes a predetermined emission current Ea to be obtained is set.

In step 92, the stabilizing unit 22c calculates the difference $\Delta E$ between the target emission current value Et and the actual emission current value Ea. In step 93, if the difference $\Delta E$ is not below 1%, in step 94, the filament voltage Vf is increased or decreased in steps at intervals set in advance (convergence process).

In step 93, if the difference $\Delta E$ is determined to be less than 1%, the convergence process ends, there is a transition to feedback control in step 95, and in the present embodiment a PID loop is executed. In step 96, the difference $\Delta Vf$ for the filament voltage Vf that is the output of the PID control is acquired, and the filament voltage Vf is corrected with $\Delta Vf$. In step 97, the difference $\Delta E$ for the emission current Ea is recalculated, and if the difference $\Delta E$ is less than 0.1% in step 98, the ion drive circuitry 61 drives the ionization unit 11 at the filament voltage Vf set in this process.

After it has been determined in step 98 that the difference $\Delta E$ is 0.1% or higher, if the difference $\Delta E$ is less than 1% in step 99, the processing advances to step 95 and corrects the filament voltage Vf using feedback control. On the other hand, when the difference $\Delta E$ is 1% or more, the processing returns to step 92 and in the convergence process that corrects the filament voltage Vf by ramping up or down, the emission current Ea is caused to converge to the target value Et in a short period of time. By carrying out this processing, it is possible during measurement in the steady state to set the tolerance in the emission current Ea of the analyzer apparatus 1 at less than 0.1%, which makes it possible to manage the emission current Ea at substantially the nA level. Accordingly, it is possible to precisely supply a constant ion flow 3 to the field 13f for selecting ions formed in the filter unit 13, which means that it is possible to provide an analyzer device 1 of a type that measures gas components by ionization, but is capable of quantitative analysis.

Although the above describes, as the filter unit 13 of the analyzer apparatus 1, an example where a quadrupole field is formed as the field 13f for separating or selecting ions, the field 13f may be an electric or magnetic field, such as a fan-shaped magnetic sector, a magnetic-electric double converging field, or a time-of-flight type. The filter unit 13 may form an electric field and a magnetic field (electromagnetic field) like a Wien filter as the field 13f for selecting ions. The filter unit 13 may be a filter unit that forms, as the field 13f, an electric field for selecting ions according to ion mobility instead of the mass-to-charge ratio, for example, a non-vacuum filter unit 13, such as a FAIMS. It is also possible to use a filter unit 13 that forms a combination of a plurality of different types of fields 13r.

Also, although the analyzer apparatus 1 described above is equipped with the housing (housing unit) 50 in which the sensor 10, the control box 20, and the vacuum pumps 31 and 32 and the like are integrated in a so-called "handy size", it is also possible to provide the sensor 10 and vacuum system separately to the control box 20 and house respectively in even more compact housings, and possible to accommodate a variety of arrangements, since the circuitry can maintain their precision even when there are variations in temperature around the circuitry. Although a compact sensor with a size of several cm has been given as an example of the sensor 10, the sensor 10 may be an even more compact MEMS-type sensor. The analyzer apparatus 1 may be a handy size, or may be further miniaturized to a mobile terminal or a wearable size.

The invention claimed is:

1. An analyzer apparatus comprising:
an ionization unit that ionizes molecules to analyze;
a filter unit that forms a field for selectively passing ions generated by the ionization unit;
a detector unit that detects ions that have passed through the filter unit;
an ion drive circuitry that electrically drives the ionization unit;
a field drive circuitry that electrically drives the filter unit;
a control unit that controls outputs of the ion drive circuitry and the field drive circuitry;
a temperature detecting unit that detects a temperature about the ion drive circuitry and the field drive circuitry; and
a correction unit that corrects an output setting of the ion drive circuitry and the field drive circuitry based on the temperature detected by the temperature detecting unit.

2. The analyzer apparatus according to claim 1,
further comprising a handy-type housing unit that houses at least the ion drive circuitry, the field drive circuitry, the control unit, and the correction unit.

3. The analyzer apparatus according to claim 1,
further comprising a detector circuitry that controls an output sensitivity of the detector unit,
wherein the temperature detecting unit includes a function that detects a temperature about the detector circuitry, and
the correction unit includes a unit that corrects a sensitivity setting of the detector circuitry based on the temperature detected by the temperature detecting unit.

4. The analyzer apparatus according to claim 1, further comprising:
a sensor housing that houses the ionization unit, the filter unit, and the detector unit in order;
a chamber in which the sensor housing is housed;
a depressurization unit that depressurizes an inside of the chamber; and
a capillary that introduces gas including the molecules to analyze into the ionization unit or a periphery of the ionization unit of the sensor housing.

5. The analyzer apparatus according to claim 4,
wherein the sensor housing includes an opening that connects to the chamber at a vicinity of at least one of the filter unit and the detector unit, and
the analyzer apparatus further includes a unit that feedback-controls a temperature and an internal pressure of the chamber outside the sensor housing by the depressurization unit.

6. The analyzer apparatus according to claim 5,
wherein a ratio Vc/Vh between a volume Vc of the chamber and a volume Vh of the sensor housing is 1.5 to 10.

7. The analyzer apparatus according to claim 4,
further comprising a handy-type housing unit that houses at least the ion drive circuitry, the field drive circuitry, the control unit, and the chamber.

8. The analyzer apparatus according to claim 1,
further comprising a unit that stabilizes an emission current of the ionization unit via the ion drive circuitry.

9. The analyzer apparatus according to claim 1,
wherein the field that selectively passes the ions includes at least one of an electric field, a magnetic field, and an electro-magnetic field.

10. The analyzer apparatus according to claim 1,
wherein the field drive circuitry includes a circuitry that supplies an RF output to the filter unit to form a vibration field.

11. A control method of an analyzer apparatus, the analyzer apparatus including:
an ionization unit that ionizes molecules to analyze;
a filter unit that forms a field for selectively passing ions generated by the ionization unit;
a detector unit that detects ions that have passed through the filter unit;
an ion drive circuitry that electrically drives the ionization unit;
a field drive circuitry that electrically drives the filter unit;
a control unit that controls outputs of the ion drive circuitry and the field drive circuitry; and
a temperature detecting unit that detects a temperature about the ion drive circuitry and the field drive circuitry,
wherein the control method comprises correcting, by the control unit, an output setting of the ion drive circuitry and the field drive circuitry based on the temperature detected by the temperature detecting unit.

12. The control method according to claim 11,
wherein the analyzer apparatus further includes a detector circuitry that controls an output sensitivity of the detector unit,
wherein the temperature detecting unit includes a function that detects a temperature about the detector circuitry, and
the correcting includes correcting a sensitivity setting of the detector circuitry based on the temperature detected by the temperature detecting unit.

13. The control method according to claim 11,
further comprising stabilizing, by the control unit, an emission current of the ionization unit via the ion drive circuitry.

14. An analyzer apparatus comprising:
an ionization unit that ionizes molecules to analyze;
a filter unit that forms a field for selectively passing ions generated by the ionization unit;
a detector unit that detects ions that have passed through the filter unit;
an ion drive circuitry that electrically drives the ionization unit;
a field drive circuitry that electrically drives the filter unit;
a detector circuitry that controls an output sensitivity of the detector unit;
a control unit that controls outputs of the ion drive circuitry and the field drive circuitry;
a temperature detecting unit that detects a temperature about at least one circuitry out of the ion drive circuitry and the field drive circuitry; and
a correction unit that corrects an output setting of the at least one circuitry based on the temperature detected by the temperature detecting unit,
wherein the temperature detecting unit includes a function that detects a temperature about the detector circuitry, and the correction unit includes a unit that corrects a sensitivity setting of the detector circuitry based on the temperature detected by the temperature detecting unit.

\* \* \* \* \*